Sept. 10, 1968  L. A. AMTSBERG ET AL  3,400,633
ULTRA-TORQUE NUT RUNNER WITH MOTOR BRAKE
Filed Aug. 16, 1966  2 Sheets-Sheet 1

INVENTOR
LESTER A. AMTSBERG
WILLIAM K. WALLACE
BY
Stephen J. Rudy
ATTORNEY

Sept. 10, 1968   L. A. AMTSBERG ET AL   3,400,633
ULTRA-TORQUE NUT RUNNER WITH MOTOR BRAKE
Filed Aug. 16, 1966   2 Sheets-Sheet 2

INVENTOR
LESTER A. AMTSBERG
WILLIAM K. WALLACE
BY
Stephen J. Rudy
ATTORNEY

# United States Patent Office 3,400,633
Patented Sept. 10, 1968

3,400,633
ULTRA-TORQUE NUT RUNNER WITH MOTOR BRAKE
Lester A. Amtsberg, Utica, and William K. Wallace, Berneveld, N.Y., assignors to Chicago Pneumatic Tool Company, New York, N.Y., a corporation of New Jersey
Filed Aug. 16, 1966, Ser. No. 572,753
7 Claims. (Cl. 91—59)

ABSTRACT OF THE DISCLOSURE

There is disclosed a nut runner having a motor connected by means of a torque releasable cam clutch to an output spindle. The clutch includes a driving member drivingly engaged by means of rollers in cam pockets of a driven member. Upon development of a predetermined torque in the work, the driving member cams the driven member axially and simultaneously carries the rollers out of the pockets in an overriding direction. Before the rollers can be carried over cam slopes between the pockets into the next succeeding pockets, valve mechanism operable by the axial movement of the driven member interrupts positive live air feed to the motor and causes it to be fed to the motor in a reverse direction. The motor is arrested in its positive movement by the counteracting force of this reverse air feed before the rollers can move over the cam slopes into the next pockets. A return clutch spring responds to this arrested condition to return the clutch members to engagement with the rollers moving back into their original pockets. The valve mechanism responds to this re-engaging action to cause resumption of the air feed to the motor in a positive direction. The dis-engaging and re-engaging action of the clutch continues in this manner until the air feed to the tool is finally terminated by the operator or by control means. Any reverse action that occurs in the motor during the re-engaging action is brief and is terminated upon clutch re-engagement before it can be transmitted to the work.

---

The invention is concerned with a pneumatically powered nut-runner that is adapted following delivery of maximum torque to the work to repeatedly recycle at a reduced frequency until the flow of pneumatic power to the tool is finally shut off.

The invention constitutes a patentably distinct modification of the nut-runner of our co-pending application Ser. No. 446,315, filed Apr. 7, 1965, now Patent No. 3,322,-205. In the latter, a driving clutch member carries cam rollers which are drivingly engaged in cam pockets of a driven clutch member. These pockets are separated from one another by cam lobes. The cam rollers are adapted upon delivery of maximum torque to ride out of the pockets onto the cam lobes. This action causes operating air flow to the motor to be interrupted. However, residual energy in the motor continues to carry the rollers up the cam lobes. But before the rollers can override the crests of the lobes and re-engage in the next succeeding pockets, natural resisting forces in the tool counteract the residual energy of the motor causing it to return the rollers to their original pocket positions. Whereupon this action, operating air flow is resumed and the cycle is repeated. Cycling in this manner repeatedly continues until the operating air flow to the tool is finally terminated by the operator or by automatic control means.

The present invention differs from the foregoing nut-runner in that instead of relying upon the natural resisting forces of the nut-runner to counteract the residual energy of the motor, it provides a positive means to abruptly brake the action of the motor in a positive direction and to drive it in a reverse direction sufficiently to return the rollers to their original pockets. It does this by interrupting the flow of air to the motor in a positive direction upon attainment of maximum torque delivery and by diverting the air flow to the motor briefly in a reverse direction. The cycling operation continues in this manner until finally terminated by the operator or by associated automatic control means.

Figure 1:
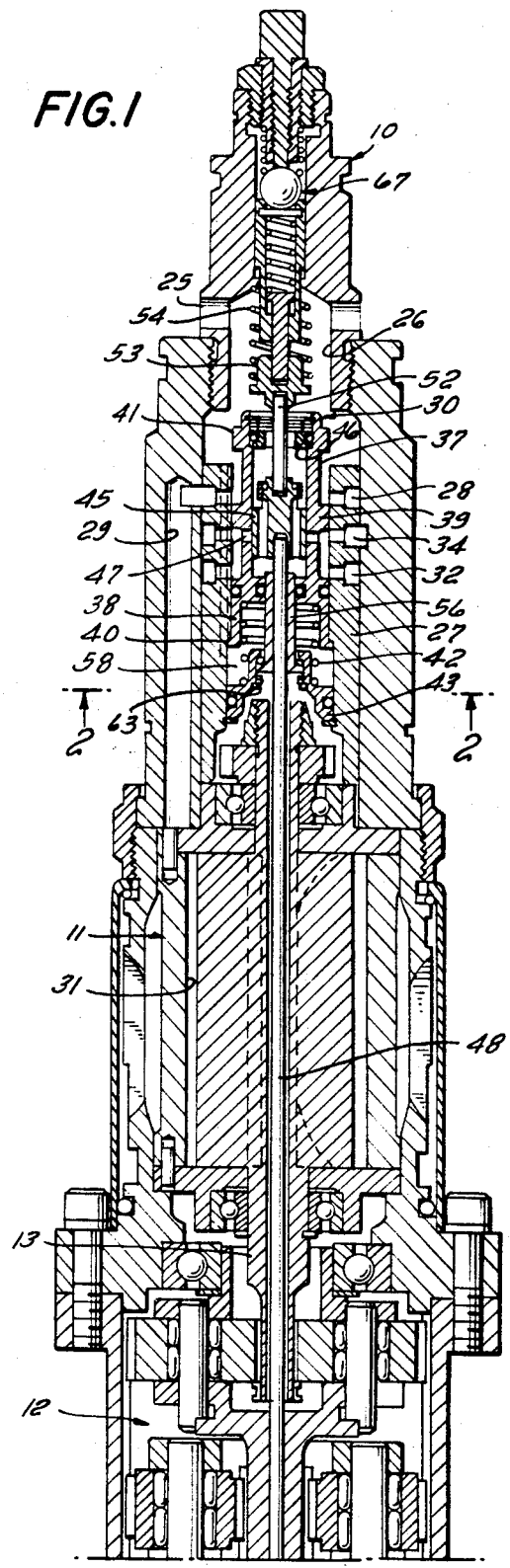
Figure 6:
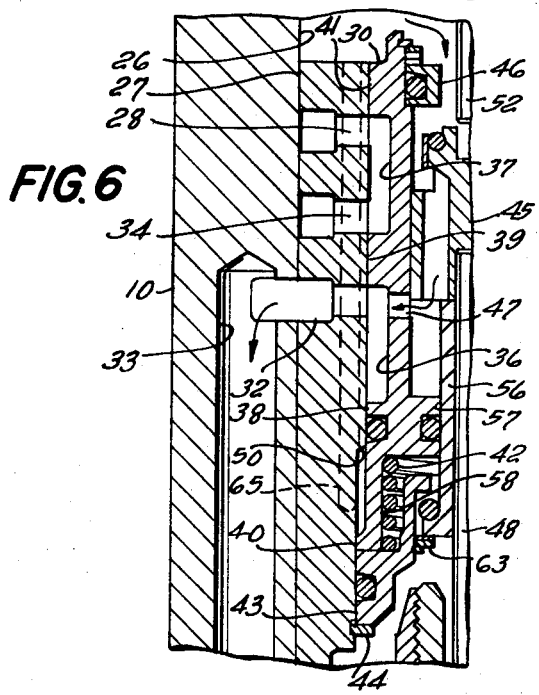
Figure 7:
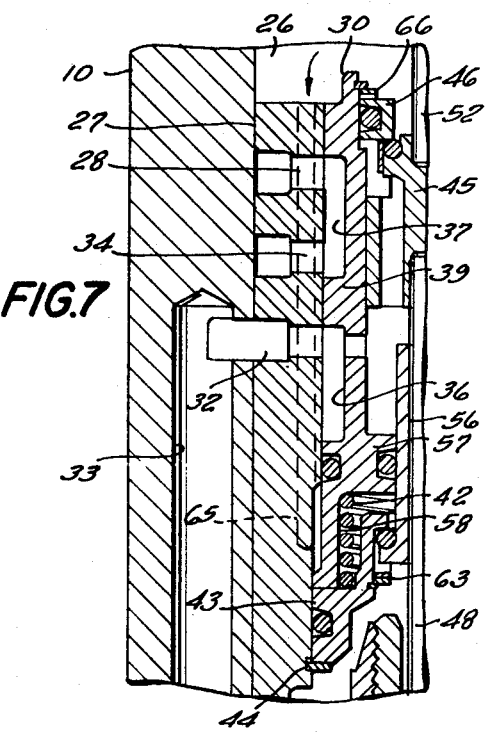
Figure 1A:
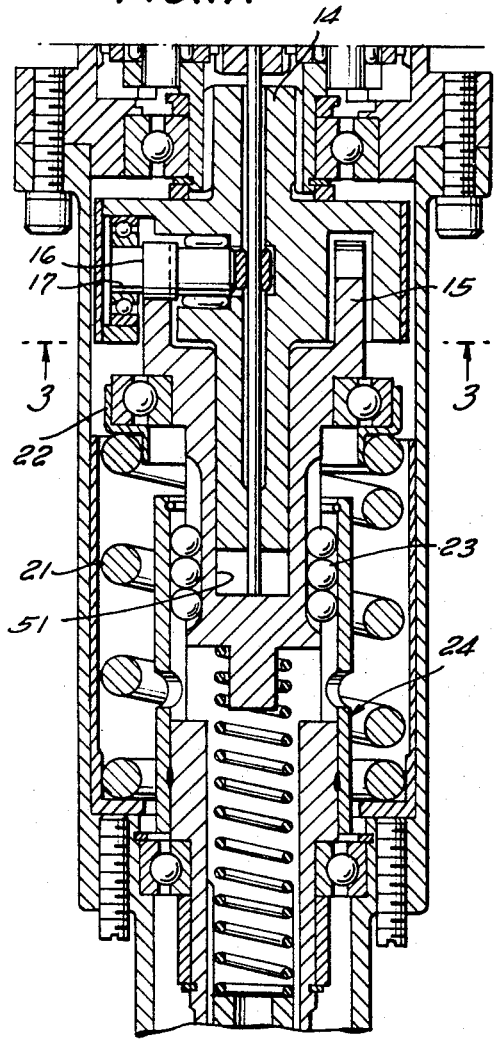
Figure 2:
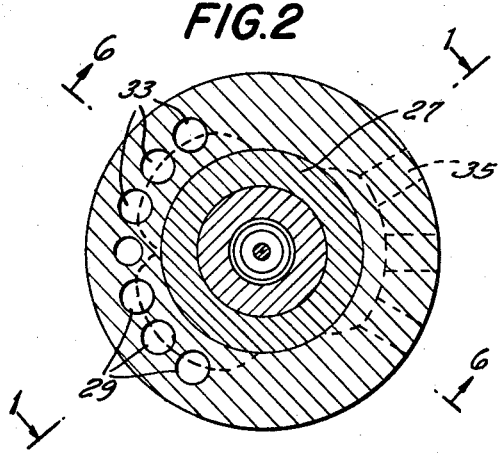
Figure 3:
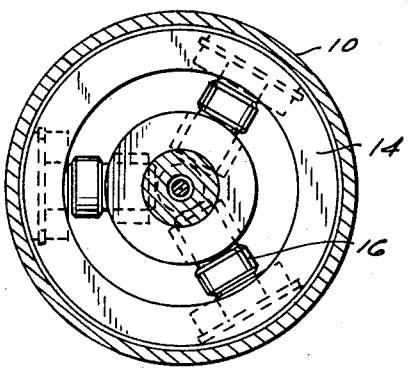
Figure 4:
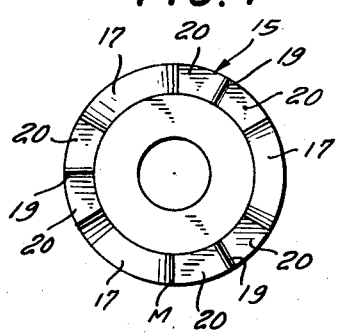
Figure 5:
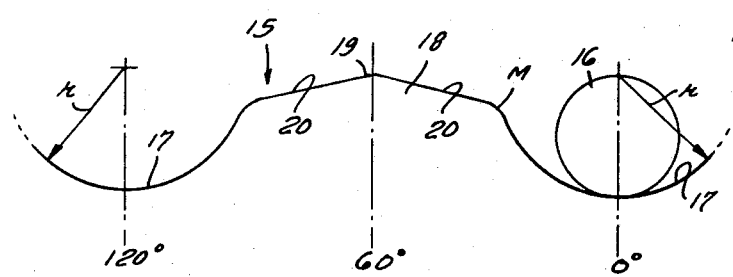

In the accompanying drawings:
FIGS. 1 and 1A are continuations of one another in section on line 1—1 of FIG. 2, in which FIG. 1 represents the upper part of a nut-runner embodying the invention; and FIG. 1A represents the lower part;
FIG. 2 is a section on line 2—2 of FIG. 1;
FIG. 3 is a section on line 3—3 of FIG. 1A directed to showing the underside of the driving clutch member with the driven clutch member omitted;
FIG. 4 is a detail of the cam face of the driven clutch member;
FIG. 5 is a development view of a cam lobe, and of a roller engaged in one of the clutch pockets;
FIG. 6 is a fragmentary section of FIG. 1 showing the condition of the air feed control mechanism momentarily after maximum torque has been delivered to the work; and
FIG. 7 is a section similar to FIG. 6, but showing the condition of the air feed control mechanism following re-engagement of the clutch.

In the drawings, a nut-runner is disclosed having a housing 10 in which is supported a conventional pneumatically powered rotary motor 11 of the radially slidable vane type. Drivably coupled by means of reduction gearing 12 to an output end of the motor's shaft 13 is a driving clutch member 14 of a rotary cam clutch. The driving member has a torque releasable driving engagement with a driven cam clutch member 15. This driving engagement (FIGS. 1A and 3) is defined here by means of a group of circumferentially equally spaced rollers 16 carried by the driving member 14, each having clutched engagement with a separate pocket 17 of the driven member. Each pocket (FIGS. 4 and 5) has an inside radius $r$ relatively greater than the radius of the roller 16 engaged therein; and each pocket is circumferentially separated from the other by means of a cam lobe or tooth 18. Here, each lobe is of generally triangular configuration. Each lobe has a crest 19 centered between the neighboring pockets. The crest is defined by a slight radius at the vertex of a pair of oppositely sloping cam surfaces 20. Each cam slope 20 declines at a slight angle and forms a slight outside radius M with the high end of the adjacent pocket. This outside radius defines a point at which maximum torque is delivered by the driving clutch member to the driven member.

The driven clutch member 15 is cammable axially under overload by the driving member against the resistance of a heavy clutch spring 21. This spring constantly biases the driven member 15 into clutched engagement with the driving member 14. The clutch engaging force of the spring is transmitted through a bearing cup 22 to the driven member. The driven member has a slidable splined driving connection at 23 with output spindle means 24 connected at its terminal end (broken away) with a work engaging member, such as a wrench socket.

An inlet port 25 to the housing is connectable to an external source (not shown) of pneumatic operating fluid. Port 25 connects with an inlet or supply chamber 26 provided above a stationary valve bushing 27. The bushing has a plurality of side ports, of which port 28 connects through housing passages 29 (FIGS. 1, 2) with a positive area of the motor chamber 31; port 32 connects through other housing passages 33 (FIGS. 2, 6) with a negative area of the motor chamber; and a venting port 34 connects with venting passages 35 (FIG. 2).

An open ended reversing valve 30 is slidable within the bushing 27 relative to the several ports 28, 32 and 34. It has a pair of annular grooves 36, 37. At the lower end of groove 36 is a piston land 38 bearing upon the bushing wall. An intermediate land 39 separates the lower groove from the upper groove; and a land 41 is provided about the upper end of groove 37. A spring 42 positioned between the underside of valve 30 and a shoulder of a control valve seat 43 constantly holds the seat 43 in abutment with a retainer ring 44, and normally holds the reversing valve 30 in elevated condition, as in FIG. 1. A foot flange 40 of the reversing valve cooperates with an internal shoulder 50 of bushing 27 to limit the extent of upward movement of the valve. In this elevated or normal condition of the reversing valve, port 28 leading to the positive area of the motor chamber is blocked by land 39 from the venting port 34 and is in communication with the air supply chamber 26; and port 32 leading to the negative area of the motor chamber is in communication with the venting port 34.

Cooperating with the reversing valve 30 in controlling feeding of supply air to ports 28 and 32 is a shut-off valve 45. The latter is slidable within the reversing valve relative to a valve seat 46 carried in an internal groove of the reversing valve, and is also slidable relative to a side port 47 communicating through the reversing valve with the peripheral groove 36. The shut-off valve is seated axially atop a long control slide rod 48. This rod depends with a slight clearance through the motor shaft 13 into a bore 51 of the driven clutch member where it abuts the bottom of the bore. A short control rod 52 seated axially atop the shut-off valve 45 extends upwardly beyond the reversing valve and carries at its top end a spring cup 53. A spring 54 positioned between the spring cup and an overhead shoulder of the air supply chamber 26 exerts a downward force through the cup upon the short rod and the shut-off valve, but is disabled from moving the shut-off valve downward because of the opposing greater resistance of the clutch spring 21 which normally holds the driven clutch member engaged and both control rods 48 and 52 elevated, as in FIG. 1.

The shut-off valve 45 has a normal condition as in FIG. 1, in which it is displaced downward from its seat 46, and in which its peripheral body area blocks operating air flowing through the upper interior area of the reversing valve and through the valve seat 46 from passing through the side port 47 and port 32 to the negative area of the motor chamber.

A control valve 56 slidable about the long rod 48 serves to constantly seal the interior area of the reversing valve against leakage through a portition wall 57; and it also serves to control venting of inlet pressure air from a counterbalancing chamber 58 at the underside of the reversing valve. The control valve has a normal position as in FIG. 1 wherein it is biased by a spring washer 63 closed upon its seat. This prevents venting of air from the counterbalancing chamber 58 through associated passages (not designated) leading to atmosphere. The seat 43 of the control valve 56 has a slide fit in chamber 58 and is held upon a retainer ring 44 by spring 42.

The operation of the tool is as follows: at the start of its operation the tool has the condition shown in FIGS 1 and 1A. Operating air entering the inlet or supply chamber 26 flows in part into the upper interior of the reversing valve 30, but is blocked by the shut-off valve 45 from flowing to the side port 47 leading to the negative area of the motor chamber. Operating air also flows around the elevated reversing valve and the upper groove 37 through port 28 and passages 29 to the positive area of the motor chamber, causing the motor to rotate in a positive direction. Torque is accordingly transmitted from the motor and associated cam clutch members to the work. As the torque being delivered approaches a predetermined maximum, the driving clutch member 14 advances relative to the driven clutch member 15 causing its rollers 16 to ride up the high ends of the pockets 17 and to progressively cam the driven member 15 axially downward. Spring 54 expands in response to this initial movement, causing both control rods 52 and 48 together with the shut-off valve 45 to follow as a unit the axial movement of the driven clutch member. As this downwaard movement of the control rods progresses, the body of the shut-off valve 45 engages an end of the control valve 56 while continuing to seal over port 47. At about the time that the rollers are carried over or caused to override the points M of the cam lobes 18 to deliver maximum torque and then ride onto the cam slopes 20, the shut-off valve 45 is forced slightly further down to open the control valve 56 as in FIG. 6. This action rapidly vents the counterbalancing chamber 58 causing a pneumatically unbalanced condition of the reversing valve. As a consequence, the reversing valve 30 is caused by the greater pressure of air acting over its head to suddenly shift downward to its reverse position relative to the several ports 28, 32 and 34 and to the shut-off valve 45, as in FIG. 6. This occurs while the rollers are still on the cam slopes 20 and have not as yet reached the crests of the cam lobes. In this shifted condition of the reversing valve, port 28 leading to the positive area of the motor chamber is connected by groove 37 with the venting port 34 and is blocked off from the inlet chamber 26; and the inlet chamber is placed in communication through the interiors of the reversing valve and the shut-off valve with the side port 47 which connects through port 32 and the housing passages 33 with the negative area of the motor chamber; and the piston portion 38 of the reversing valve blocks the inlet connected bushing passage 65 from the counterbalancing chamber 58. Operating air now flows from the inlet chamber 26 to the negative area of the motor chamber to apply a torque force in a reverse direction upon the motor. This sudden shifting of air flow relative to the motor counteracts any tendency of residual energy of the motor to move the motor in a positive direction; and as a result the motor and driving clutch member are stopped from further movement in a positive direction while the rollers are still on the cam slopes and before they can be carried over the cam crests into the next pockets.

As the motor momentarily stops as a result of the foregoing shifting action of the reversing valve, the clutch spring 21 re-expands to re-engage the clutch members and to impart a reverse rotation to the motor, causing the rollers to be returned down the cam slopes into their pockets. This reverse rotation and reverse application of operating air to the motor is brief. As the driven clutch member 15 is returned by its spring 21 into re-engagement, the control rods 48, 52 and shut-off valve 45 are re-elevated against the resistance of the overhead spring 54. In this action the reversing valve 30, because of its pneumatically unbalanced condition, does not immediately restore. This allows the shut-off valve 45 upon being re-elevated to engage its seat 46 and thus block flow of inlet air through the shut-off valve to the side port 47, as in FIG. 7. As the shut-off valve engages its seat, it closes tight as the seat 46 is forced slightly upward against the resistance of an overhead spring washer 66. As the shut-off valve engages its seat, it moves clear of the control valve 56, causing the latter to close under relaxation of its spring washer 63. The closed condition of the several valves 30, 45 and 56 at this time is shown in FIG. 7.

This condition is brief and serves to afford a short time delay before the tool is caused to recycle. Within a brief period, air from the inlet chamber 26 entering the bushing passage 65 bleeds around the end 40 of the reversing valve to progressively fill the counterbalancing chamber 58. As soon as the pressure in the latter chamber counterbalances that acting over the head of the reversing valve 30, the latter is abruptly returned by its spring 42 to its normal elevated condition, as in FIG. 1, to cause reshifting of operating air flow through ports 28 to the positive area of the motor chamber and shutting it off from the reverse area. The tool then recycles and operates as before; and it repeatedly does so, until either the operator intervenes to finally shut off operating air flow to the tool; or until switch mechanism, such as that indicated generally at 67 and described in detail in the co-pending application Ser. No. 446,315, functions automatically to finally shut off all air flow to the tool.

The frequency of the operating cycles of the tool and, accordingly, the number of excursions that the rollers 16 of the clutch make over the maximum torque delivery points M is materially reduced by the motor braking mechanism described herein.

What is claimed is:

1. A torque controlled nut-runner comprising an output spindle; a rotary pneumatic motor; means for feeding pneumatic operating fluid to the motor to drive it in a positive direction; a torque releasable cam clutch drivingly coupling the motor to the spindle; the clutch including a driving member rotatable with the motor and carrying cam rollers in an end face thereof, a driven member connected to the spindle having cam pockets engaged by the rollers and having a cam lobe separating each pocket from the other; each lobe having a crest; a first sloping surface inclined upwardly to the crest from an adjacent pocket and an opposed sloping surface declining downwardly from the crest to the next adjacent pocket; a yieldable spring constantly urging the driven member into engagement with the driving member; the driven member adapted to be cammed by the driving member axially away from the driving member upon developing a predetermined torque resistance, and the driving member adapted simultaneously therewith to carry the rollers out of their pockets onto the first sloping surfaces; means responsive to the latter action to shift the feeding of pneumatic operating fluid to the motor in a reverse direction to impart to the motor a braking force counteracting its positive rotation and arresting the rollers upon the first sloping surfaces before the rollers can be carried over the crests of the lobes into the next succeeding pockets; the spring being responsive to such arresting action to return the driven member axially relative to the driving member so as to cause cooperation of the first sloping surfaces with the rollers and consequent brief reverse rotation of the driving member relative to the driven member to carry the rollers back to re-engaged condition into the same pockets in which they had previously been engaged; and including mechanism responsive to the return action of the spring to shut off feeding of operating air to the motor in said reverse direction and to re-shift to a positive direction the feeding of pneumatic operating fluid to the motor.

2. In a torque controlled nut-runner including a pneumatic rotary motor, a torque releasable rotatable cam clutch having a driving member coupled to the motor and a driven member cam engaged with the driving member, the driving member adapted upon experiencing overload to override the driven member and to exert an axially directed force upon the latter, the driven member adapted under such force to move axially out of engagement relative to the driving member; the improvement comprising: air feed control means having a normal position feeding operating air to the motor in a positive direction and having a reverse position for feeding operating air to the motor in a reverse direction, means responsive to said axial movement of the driven member to cause shifting of the control means to its reverse position and as a consequence cause feeding of operating air to the motor in a reverse direction to arrest the overriding action of the driving member, spring means responsive to said arresting action to impart a reverse rotation to the motor relative to the driven member and simultaneously therewith return the driven member axially to clutched engagement and mechanism responsive to the return action of the spring means to shut off feeding of operating air to the motor in said reverse direction before the reverse rotation of the motor can be transmitted to the work.

3. In a torque controlled nut-runner, as in claim 2, including time delay means automatically operable as a consequence of the shutting off of operating air to the motor in a reverse direction to cause after a moment of delay reshifting of the control means to its normal position.

4. In a torque controlled nut-runner as in claim 2, wherein the air feed control means includes an air supply chamber; a valve bushing having a positive port for feeding supply air to the motor in a positive direction, a negative port for feeding supply air to the motor in a negative direction, and a venting port; and shiftable valve means having a normal position communicating the positive port with the supply chamber, and communicating the negative port with the venting port, and having a reverse position communicating the positive port with the venting port and communicating the supply chamber with the negative port.

5. In a torque controlled nut-runner as in claim 4, wherein the shiftable valve means includes a reversing valve having a normal position communicating the positive port with the supply chamber and communicating the negative port with the venting port and having a reverse position communicating the positive port with the venting port; the reversing valve having an interior recess communicable with the supply chamber and having a side port for communicating the recess with the negative port; and a shut-off valve having a normal position communicating the recess with the supply chamber and sealing the recess off from the side port.

6. In a torque controlled nut-runner including a pneumatic rotary motor, a torque releasable rotatable cam clutch having a driving member coupled to the motor and a driven member cam engaged with the driving member, the driving member adapted upon experiencing overload to override the driven member and to exert an axially directed force upon the latter, the driven member adapted under such force to move axially out of engagement relative to the driving member; the improvement comprising: air feed control means having a normal position feeding operating air to the motor in a positive direction and having a reverse position for feeding operating air to the motor in a reverse direction, means responsive to said axial movement of the driven member to cause shifting of the control means to its reverse position and as a consequence cause feeding of operating air to the motor in a reverse direction to arrest the overriding action of the driving member, and spring means responsive to said arresting action to impart a reverse rotation to the motor and simultaneously therewith return the driven member to clutched engagement; wherein the air feed control means includes an air supply chamber; a valve bushing having a positive port for feeding supply air to the motor in a positive direction, a negative port for feeding supply air to the motor in a negative direction, and a venting port; and shiftable valve means having a normal position communicating the positive port with the supply chamber, and communicating the negative port with the venting port, and having a reverse position communicating the positive port with the venting port and communicating the supply chamber with the negative port; wherein the shiftable valve means includes a reversing valve having a normal position communicating the positive port with the supply chamber and communicating the negative port with the venting port and having a reverse position communicating the positive port with the venting port; the reversing valve having an interior recess communicable with the supply chamber and having a side port for communicating the recess with the negative port; and a shut-off valve having a normal position communicating the recess with the supply chamber and sealing the recess off from the side port; and wherein the shut-off valve has an initially moved position relative to the reversing valve communicating the side port with the recess when the reversing valve is in its reverse position, and the shut-off valve has a subsequently moved position closing communication of the recess with the supply chamber upon return of the driven member to clutched engagement.

7. In a torque controlled nut-runner as in claim 6, wherein mechanism responsive to the return action of the spring means is cooperable with the shut-off valve to carry it to its subsequent position closing communication of the recess with the supply chamber.

References Cited

UNITED STATES PATENTS

| | | | |
|---|---|---|---|
| 2,441,201 | 5/1948 | Ludwig | 91—420 X |
| 2,499,708 | 3/1950 | Whitledge | 91—59 X |
| 2,725,918 | 12/1955 | Dreshler | 91—59 |
| 3,039,491 | 6/1960 | Raney | 91—420 X |
| 3,234,957 | 2/1966 | Allen | 91—446 X |
| 3,322,205 | 5/1967 | Amtsberg et al. | 192—150 X |
| 3,354,754 | 11/1967 | Amtsberg et al. | 173—12 X |

FOREIGN PATENTS 643,265　8/1959　Canada.

MARTIN P. SCHWADRON, *Primary Examiner.*

G. N. BAUM, *Assistant Examiner.*